(12) United States Patent
Lenhof et al.

(10) Patent No.: US 9,874,801 B2
(45) Date of Patent: Jan. 23, 2018

(54) DEVICE FOR ADJUSTING A CAMERA LENS

(71) Applicant: Carl Zeiss AG, Oberkochen (DE)

(72) Inventors: Helmut Lenhof, Steinheim (DE);
Benedikt Hartmann, Schwabisch Gmund (DE); Hannes Buchegger, Vienna (AT); Wolfgang Parizek, Krems/Donau (AT); Michael Haubmann, Vienna (AT)

(73) Assignee: Carl Zeiss AG, Oberkochen (DE)

( * ) Notice: Subject to any disclaimer, the term of this patent is extended or adjusted under 35 U.S.C. 154(b) by 290 days.

(21) Appl. No.: 14/680,487

(22) Filed: Apr. 7, 2015

(65) Prior Publication Data
US 2015/0286111 A1 Oct. 8, 2015

(30) Foreign Application Priority Data

Apr. 7, 2014 (DE) .......... 10 2014 206 657

(51) Int. Cl.
| | | |
|---|---|---|
| G03B 13/34 | (2006.01) | |
| H04N 5/225 | (2006.01) | |
| H04N 5/232 | (2006.01) | |
| G03B 3/10 | (2006.01) | |
| G03B 5/00 | (2006.01) | |
| G03B 17/56 | (2006.01) | |

(52) U.S. Cl.
CPC ............ *G03B 13/34* (2013.01); *G03B 3/10* (2013.01); *G03B 5/00* (2013.01); *G03B 17/56* (2013.01); *H04N 5/2254* (2013.01); *H04N 5/23296* (2013.01); *G03B 2205/0053* (2013.01)

(58) Field of Classification Search
None
See application file for complete search history.

(56) References Cited

U.S. PATENT DOCUMENTS

| | | | |
|---|---|---|---|
| 3,370,907 A | 2/1968 | Cox et al. | |
| 3,940,777 A * | 2/1976 | Komine | G03B 19/18 352/140 |
| 5,508,852 A * | 4/1996 | Bednarsky | G03B 17/14 359/697 |
| 6,148,151 A | 11/2000 | Bauer | |
| 2009/0051806 A1* | 2/2009 | Haubmann | G03B 17/18 348/347 |

FOREIGN PATENT DOCUMENTS

| | | |
|---|---|---|
| DE | 1931780 U | 1/1966 |
| DE | 1273321 B | 7/1968 |
| DE | 2440974 A1 | 3/1975 |
| DE | 2758630 A1 | 7/1978 |
| EP | 0574105 A1 | 12/1993 |
| EP | 0575022 B1 | 8/1996 |
| EP | 0942305 A1 | 9/1999 |
| EP | 1721214 B1 | 12/2011 |

* cited by examiner

*Primary Examiner* — Roberto Velez
*Assistant Examiner* — Yih-Sien Kao
(74) *Attorney, Agent, or Firm* — The Webb Law Firm (57) ABSTRACT

A device for adjusting a camera lens, which includes at least one lens ring rotatable about the optical axis of the camera lens for zoom, focus or aperture adjustment, which is connectable with a driving device actuatable by an electronic control unit, includes a retaining device connected with the camera lens, which is adapted to the contour of the camera lens, for accommodating a fastening mechanism of a drive system containing the driving device and the electronic control unit.

21 Claims, 8 Drawing Sheets

DEVICE FOR ADJUSTING A CAMERA LENS

CROSS-REFERENCE TO RELATED APPLICATION

This application claims priority to German Patent Application No. 10 2014 206 657.3 filed Apr. 7, 2014, the disclosure of which is hereby incorporated in its entirety by reference.

Description

BACKGROUND OF THE INVENTION

Field of the Invention

This invention relates to a device for adjusting a camera lens.

Description of Related Art

The adjustment of the aperture opening, the focus and the focal length of a camera lens is made on lens rings which are manually rotatable about the optical axis of the camera lens. For an easier and more reliable adjustment of the lens rings, however, electromotive drive units are used, which are arranged on iris rods connected with a camera and via a pinion each transmit a torque onto an external toothing of the lens rings. The control of the drive unit either is effected by means of a control device integrated into the drive unit or on the part of the camera.

From EP 0 942 305 A1 a control system for a camera lens is known, which by means of a lens mount is attached to a lens receptacle of a motion picture camera. The control system contains several drive units for the automatic adjustment of setpoint positions of three lens rings, via which the focus, the iris aperture and the focal length of the camera lens are adjustable. The lens rings are provided with a device for determining the actual condition of the lens ring positions, which determines the actual position of the lens rings relative to the camera lens, converts the same into measurement output signals and in a contactless manner is formed as optoelectronic angle sensor with a coding disk with several coding tracks, a light transmitter and a light receiver, which is non-rotatably connected with the respective lens ring, or is formed as magnetic sensor and is integrated into the camera lens.

In these devices it is disadvantageous that the drive units either are inseparably connected with the camera lens or must be mounted, adjusted and calibrated in their entirety via screw connections or on iris rods, which renders the handling and replacement of the camera lens or the drive units much more difficult. In addition, the drive units require much space, due to their dimensions each only are suitable for certain camera lenses, and require screwdriving tools for assembly.

Therefore, it is the object underlying the present invention to provide a device for adjusting a camera lens as mentioned above, which is universally and variably usable, is compact, space-saving and easy to handle and easy to operate, and is connectable with a camera lens easily and without any tools.

SUMMARY OF THE INVENTION

The solution according to the invention provides a device for adjusting a camera lens, which is connectable with a camera lens without use of a tool, is usable universally and variably for different camera lenses and lens rings of different diameters, is directly connectable with the camera lens in a compact and space-saving manner, and is easy to handle and to operate.

Correspondingly, the device for adjusting a camera lens according to the invention includes a retaining device directly connected with the camera lens, which accommodates a compact, modular drive system containing the driving device and the electronic control unit, so that no additional devices arranged in the interface between camera and camera lens are required for accommodating the adjusting device.

As a result of a fastening mechanism of the drive system which is non-positively and/or positively connectable with the retaining device, the drive system can directly be attached to the camera lens and the driving device can be coupled with the lens ring or the lens rings.

Preferably, the retaining device is adapted to the contour of the camera lens and in particular formed as retaining plate with spaced receptacles for the fastening mechanism of the drive system.

Due to the adaptation of the retaining device to the diameter, i.e. the curvature, of the camera lens at its fastening point, a flat mount receptacle is ensured, so that the fastening mechanism of the drive system selectively can be adapted to the curvature of the retaining device or be formed to extend linearly between the mount receptacles. Due to the connection of different camera lenses or lens types with a retaining device, the use of a single drive system for various camera lenses is ensured. By correspondingly mounting the retaining devices on the camera lenses, different geometrical dimensions of various types of camera lenses with lens rings of different widths and lens rings of different diameters can be taken into account just like different types of adjustment such as the adjustment of several lens rings with one drive system or the modular retrofitting of driving devices, without having to modify the drive systems themselves.

The connection between the retaining device and the fastening mechanism of the drive system selectively can be formed as snap, latching, bayonet, clamping, sliding or dovetail connection, whereby a toolless connection of the drive system to the camera lens is ensured.

Preferably, the connection between the retaining device and the fastening mechanism is formed as eccentric connection, in which the retaining device includes a first retaining element and on the circumference of the camera lens spaced from the first retaining element a second retaining element, and the fastening mechanism includes a hook positively connectable with the first retaining element and an eccentric positively connectable with the second retaining element, which is connected with an actuating element, in particular with a slide, lever, rotary knob or a key.

The preferred embodiment of the connection between retaining device and fastening mechanism is characterized by a simple, fast and secure connection and correspondingly by a simple and fast release of the connection between drive system and camera lens.

To prevent an inadvertent release of the connection between retaining device and drive system, a locking mechanism blocking the connection between the retaining device and the fastening mechanism of the drive system is provided, which can consist of a spring-loaded locking pawl, a disengaging device for the actuating element or a locking slide.

The locking mechanism prevents an inadvertent release of the connection between the retaining device and the fastening mechanism, in that both for securing the connection and for releasing the connection the additional locking mechanism is required, which is independent of the actuating element for establishing the connection between retaining device and fastening mechanism.

Despite the extremely compact construction of the modular drive system, not only one lens ring is adjustable with the drive system, but if necessary all three lens rings also can be adjusted by means of the drive system. To nevertheless obtain a compact, space-saving construction of the drive system, the driving device for adjusting at least two rotatable lens rings provided with an external toothing according to a further feature of the invention contains a driven gear connected with a drive unit, which for meshing engagement into the external toothing each of one of the two lens rings is axially shiftable parallel to the optical axis of the camera lens.

The axial displacement of the driven gear can be realized in different ways. In a first embodiment, the driven gear consists of a drive pinion connected with the drive unit and an intermediate gear meshing with the drive pinion and the external toothing each of one of the two lens rings, which is axially shiftable from the external toothing of the first lens ring to the second lens ring, wherein the tooth width of the drive pinion is dimensioned such that the intermediate gear is in meshing engagement with the drive pinion along the entire length of the axial displacement of the intermediate gear.

In a second embodiment, the drive pinion is axially shiftably arranged on a polygonal or spline shaft connected with the drive unit, so that by shifting the drive pinion the positive connection between the polygonal or spline shaft and the drive pinion is maintained and hence a driving torque exerted on the drive pinion by the drive unit can be transmitted to the external toothing of the respective lens ring.

In a third embodiment, the drive unit and the drive pinion jointly are shiftably arranged on a carriage aligned parallel to the optical axis of the camera lens, i.e. the functional unit of drive unit and drive pinion together is arranged on a carriage which along a guideway aligned parallel to the optical axis of the camera lens can be shifted from the external toothing of a first lens ring to the external toothing of a second lens ring.

For adjusting the correct axial position of the driven gear, a mechanism preferably formed as fork or lever mechanism is provided, which via a suitable device in the retaining plate produces the correct axial position during the assembly of the drive system.

To produce a correct radial position with different diameters of the external toothing of the lens rings, the drive system is formed tiltable for adaptation to different external toothings of the lens rings, wherein the tilt angle of the drive system depends on the arrangement and alignment of the retaining device connected with the camera lens.

For adjusting three lens rings of a camera lens with the drive system according to the invention preferably two lens rings are adjusted by means of a first, axially shiftable driving device, while for adjusting a third lens ring its external toothing is brought in engagement with a second, preferably modular driving device.

For the correct axial and radial alignment of the second driving device, fastening points for the second driving device connectable with the third lens ring are arranged on the retaining device connected with the camera lens in the position each matching with the camera lens.

Alternatively, the assembly of the second driving device is effected by using an additional intermediate adapter which selectively is provided in the driving device or on the retaining plate.

In a further alternative, different mounting positions for different camera lenses already are provided in the drive system.

To correctly electronically detect the scales or settings of the lens rings of the respective camera lens when coupling the drive system to different camera lenses, which can include a plurality of different scale classes within a series, the retaining device according to a further feature of the invention includes a data memory in which the respective data for the scales or settings of the lens rings are stored.

The scales or settings of the lens rings of the respective camera lens thereby need not be stored in the drive system, but can be provided by the retaining device remaining at the respective camera lens, so that when changing a lens they can be read out from the electronic control unit of the drive system and correspondingly be taken into account when adjusting the lens rings.

For the calibration of the lens rings, the electronic control unit of the drive system also can describe the data memory connected with the retaining device.

In the case of a connection of the camera lens with a control and data bus and the power supply of the camera via the lens mount, it is possible to provide an electric and electronic interface at the retaining device, via which both the power supply and the data transmission between camera and camera lens as well as the data transmission between the data memory arranged in the retaining plate and the electronic control unit of the drive system can be effected.

The energy transmission preferably is effected either via mechanical, electrical contacts, in particular spring contacts, end-face contacts or blind-mating contacts consisting of a contact pin and a contact socket or in a contactless manner by means of inductive coupling, and the data transmission preferably is effected in a contactless manner by means of inductive coupling, via an infrared transmitter and receiver, RFID transponder or by means of capacitive coupling.

BRIEF DESCRIPTION OF THE DRAWINGS

Further advantages and features of the invention will now be explained in detail with reference to exemplary embodiments illustrated in the Figures of the drawing, in which.

DETAILED DESCRIPTION OF THE INVENTION

Figure 1:
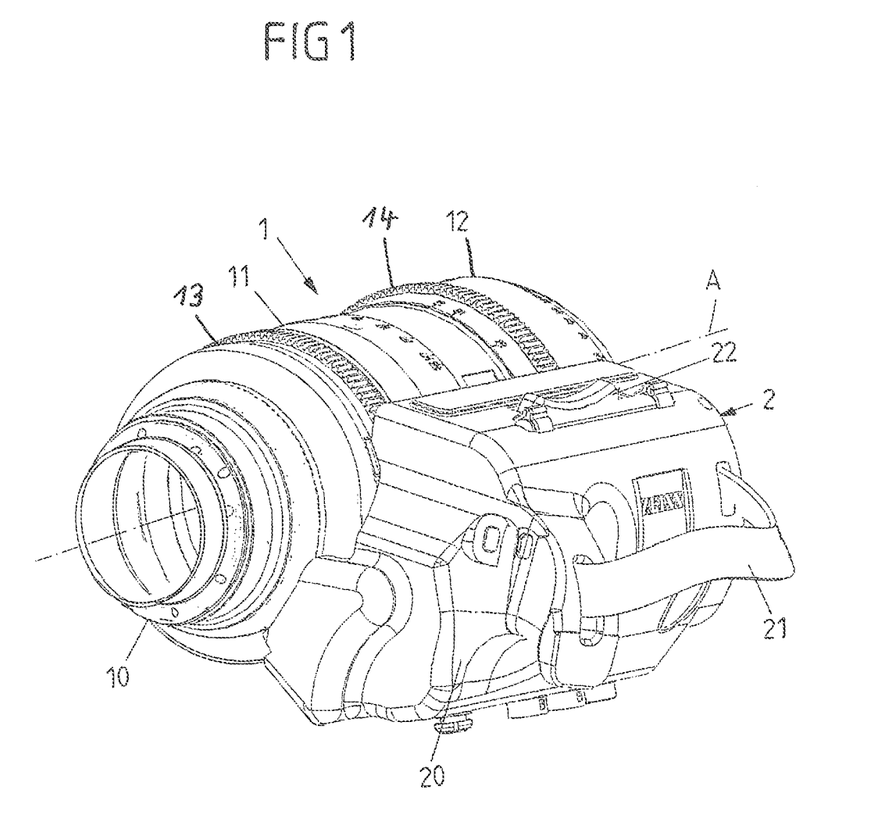
FIG. 1 shows a perspective representation of a compact drive system according to the invention attached to a camera lens.

FIG. 1 shows a perspective representation of a camera lens 1 with a lens mount 10 for connecting the camera lens 1 with a motion picture or video camera and two lens rings 11, 12 for the zoom, iris and/or focus adjustment, which each include an external toothing 13, 14. For moving the lens rings 11, 12 a drive system 2 is attached to the camera lens 1, into which driving devices are integrated for moving the lens rings 11, 12 rotatable about the optical axis A of the camera lens 1. Into the drive system 2 provided with a housing 20 and a handle 21 control elements, such as a switch 22 as well as an electronic control unit for actuating the driving devices and interfaces to external accessories furthermore are integrated. The connection of the drive system 2 with the camera lens 1 will be explained in detail below with reference to FIGS. 2 to 6.

Figure 2:
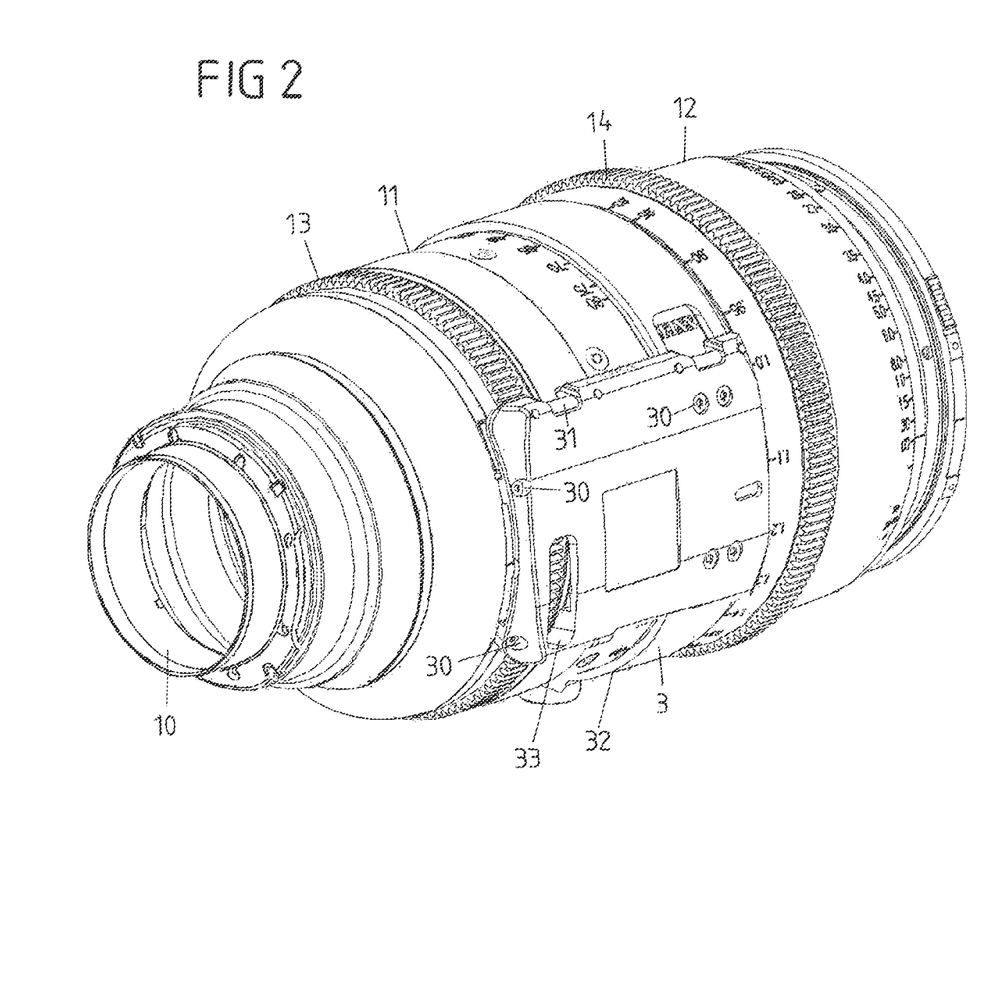
FIG. 2 shows a perspective representation of a camera lens connected with a retaining plate.

FIG. 2 shows a perspective representation of the camera lens 1 with the lens mount 10 and the lens rings 11, 12 rotatable about the optical axis A of the camera lens 1, with their external toothing 13, 14.

For attaching the drive system 2 to the camera lens 1 according to FIG. 1, a retaining plate 3 is firmly connected with the camera lens 1 via several screw connections 30, for example. For the compact arrangement of the drive system 2 at the camera lens 1, the retaining plate 3 is formed flat and adapted to the curvature of the camera lens 1 and for example arranged on the right side of the camera lens 1 as seen in shooting direction. For the fixation of the drive system 2 on the retaining plate 3, the retaining plate 3 includes retaining elements 31, 32 which are arranged at the circumferential ends of the retaining plate 3 and for example consist of locating bolts spaced from each other in axial direction or of locating rods extending parallel to the optical axis of the camera lens 1. A recess 33 in the retaining plate 3 serves for coupling a driven gear of a driving device with the external toothing 13 of the lens ring 11.

Figure 3:
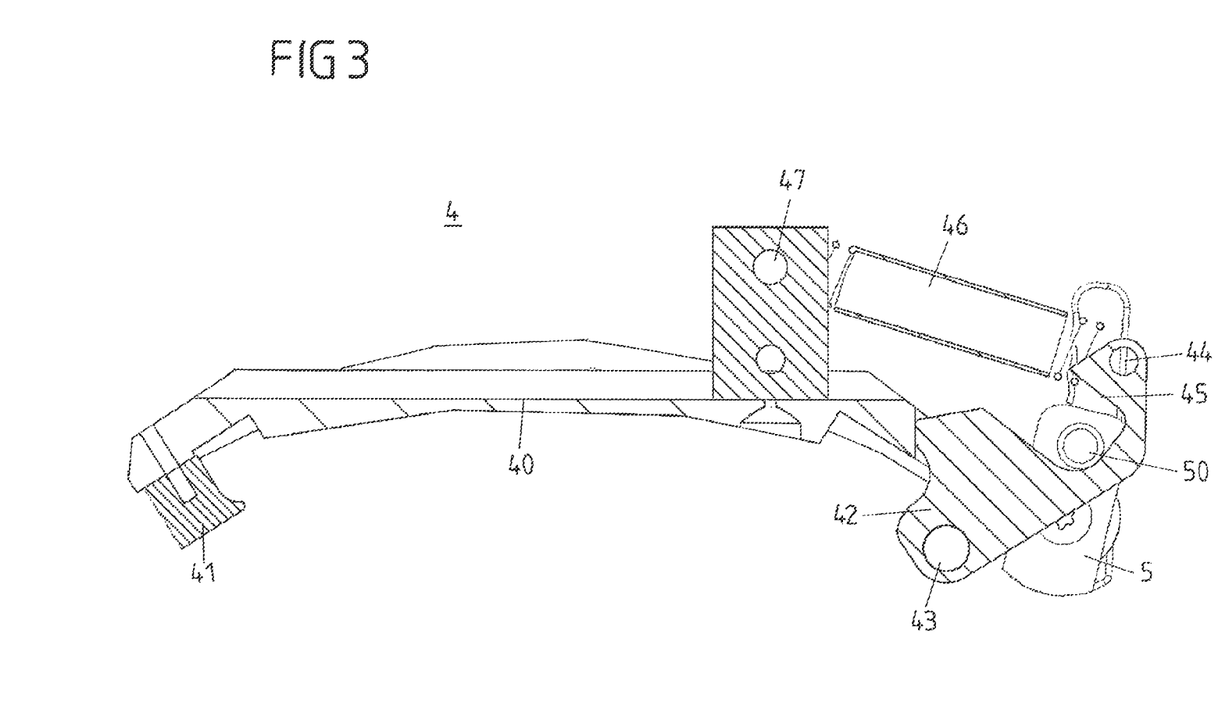
FIG. 3 shows a section through a fastening mechanism for connecting the drive system with the retaining plate.

FIG. 3 shows a section through the fastening mechanism 4 provided at the drive system 2, which for attaching the drive system 2 to the camera lens 1 is connected with the retaining elements 31, 32 of the retaining plate 3. The fastening mechanism 4 includes a fastening bridge 40 at whose one end a hook 41 and at whose other end an eccentric 42 is arranged. The eccentric 42 is pivotable about a bearing pin 43 and by means of a spiral spring 46, which is mounted on a block 47 on the one hand and on a hanging groove 44 of the eccentric 42 on the other hand, pretensioned in direction of the fastening bridge 40. The eccentric 42 contains a recess 45 into which a locking bolt 50 of a locking mechanism 5 engages.

Figure 4:
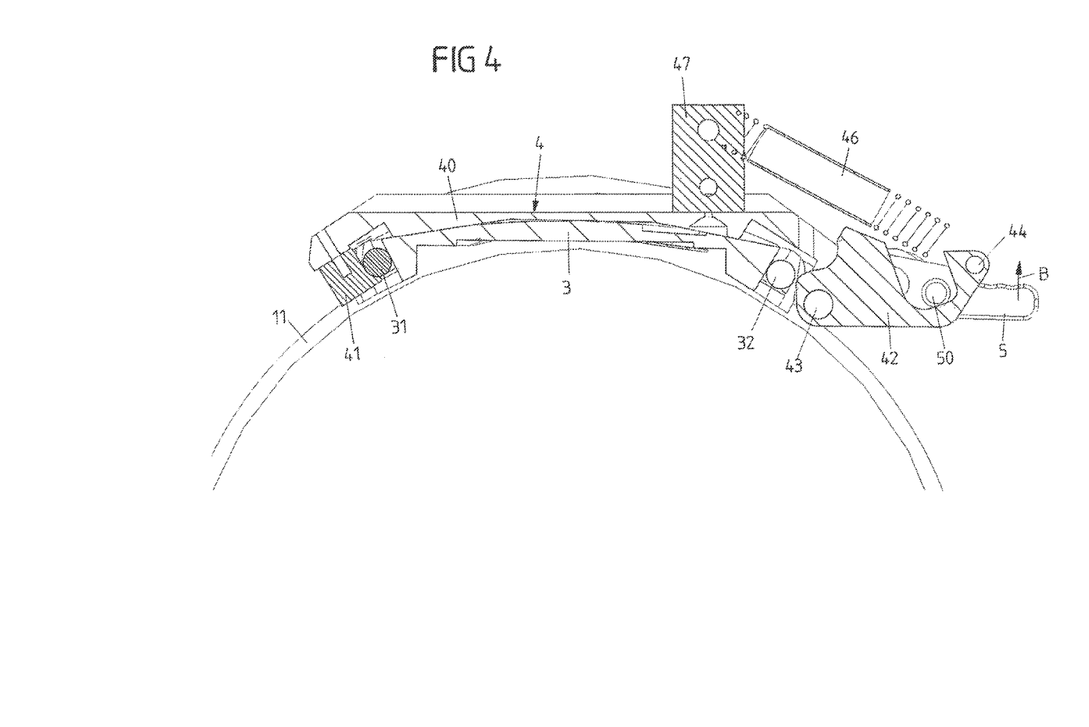
FIG. 4 shows a section through the unlocked fastening mechanism connected with the retaining plate.
Figure 5:
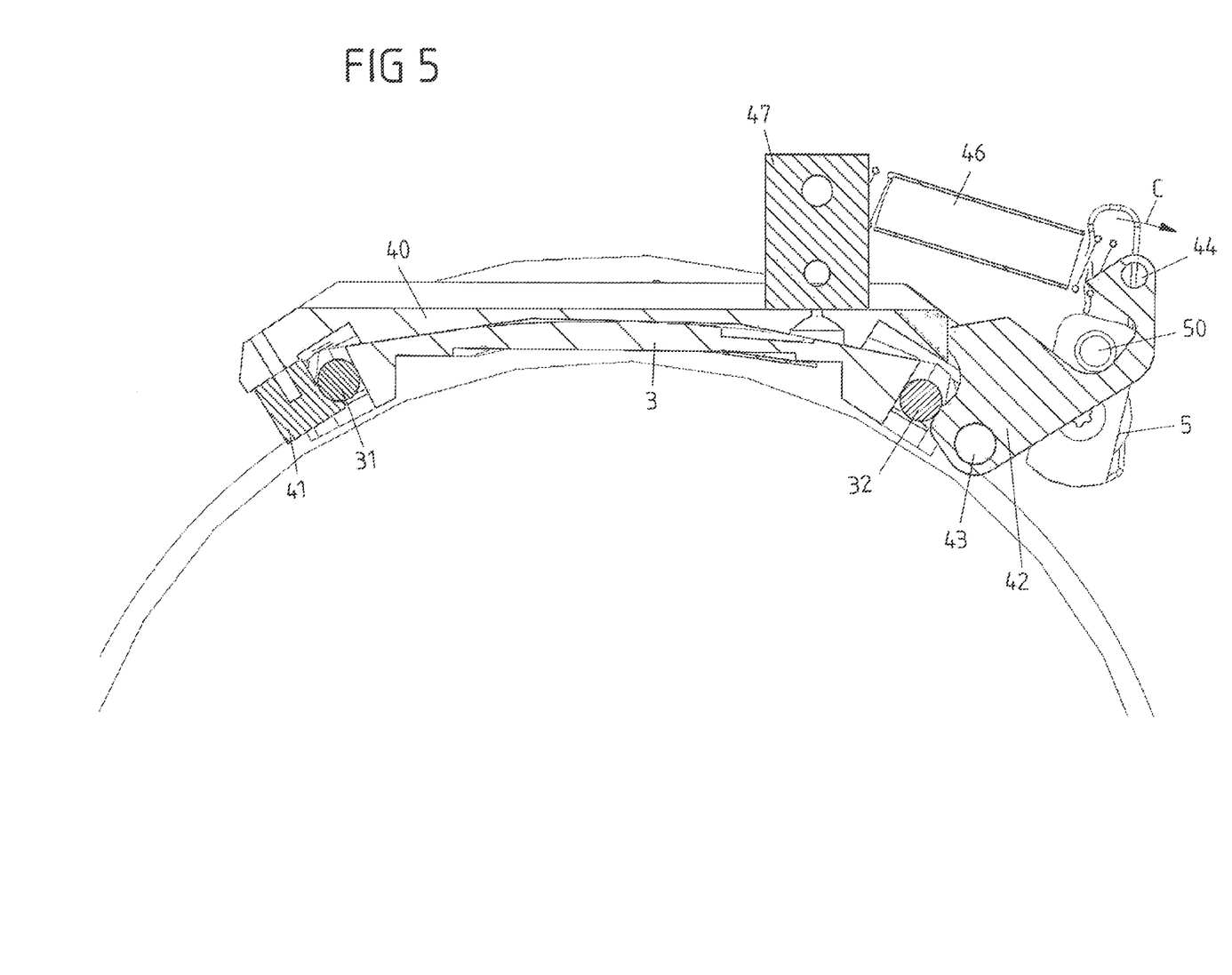
FIG. 5 shows a section through the locked fastening mechanism connected with the retaining plate.

FIG. 4 shows a section through the fastening mechanism 4 attached to the retaining plate 3 and connected with the retaining plate 3, but not unlocked yet.

For connecting the fastening mechanism 4 with the retaining plate 3, the hook 41 of the retaining plate 4 initially is hung into the first retaining element 31 and the opposite end of the fastening bridge 40 is pivoted towards the second retaining element 32 arranged at the other end of the retaining plate 3.

In this position, the eccentric 42 still is unlocked, but by the stretched spiral spring 46 pretensioned in a locking direction. By actuating the locking mechanism 5 in direction of the arrow B according to FIG. 4, the eccentric 42 is pivoted about the bearing pin 43 and according to FIG. 5 blocks the second retaining element 32 in the locked position, so that the fastening mechanism 4 is firmly and securely connected with the retaining plate 3. As a result of the spring action of the spiral spring 46 it is ensured that the locked position is maintained and only can be unlocked by actuating the locking mechanism in direction of the arrow C according to FIG. 5 against the spring action of the spiral spring 46, and the fastening mechanism 4 can be separated from the retaining plate 3.

Figure 6:
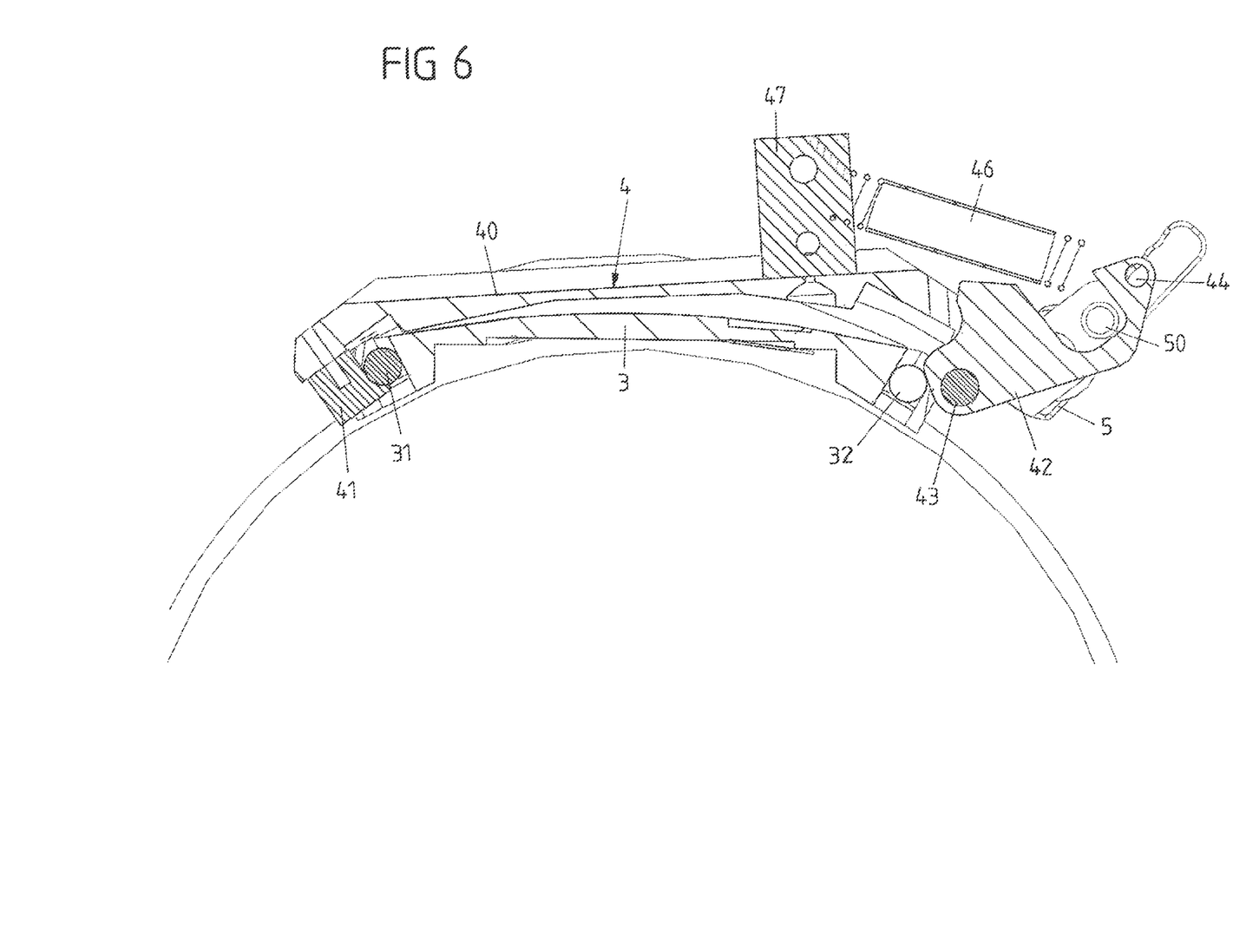
FIG. 6 shows a section through the unlocked fastening mechanism attached to the retaining plate after mounting on the retaining plate or before removing the fastening mechanism from the retaining plate or the drive system from the camera lens.

In a section through the retaining plate 3 and the fastening mechanism 4 FIG. 6 shows the unlocked fastening mechanism 4 after unlocking in a preliminary stage of folding away the fastening mechanism 4 about the first retaining element 31 for removing the fastening mechanism 4 and hence the drive system 2 from the retaining plate 3 or the camera lens 1 connected with the retaining plate 3.

For attaching the drive system 2 to the camera lens 1, the hook 41 of the fastening mechanism 4 is hooked into the first retaining element 31 of the retaining plate 3 and the drive system 2 is pivoted about this articulation, until the eccentric 42 gets in connection with the second retaining element 32 and the locking mechanism 5 fixes the eccentric 42 in a stable locking position. The driving device arranged in the drive system 2 or the driving devices arranged in the drive system is/are positioned correctly with respect to the external toothing of the lens ring/lens rings to be adjusted, as described in detail below.

As can be taken from the above description of the connection of the fastening mechanism 4 with the retaining device 3 formed as retaining plate, the attachment of the drive system 2 to the camera lens 1 is effected by means of a mechanism to be actuated without any tools. Instead of the above-described eccentric fastening mechanism, the following fastening mechanisms can be used in the alternative:

a snap connection, in which the fastening mechanism with spring-biased pawls is put onto the retaining elements of the retaining device, so that the pawls reach around the retaining elements, a clamping connection, in which the fastening mechanism is non-positively or frictionally put onto corresponding receptacles of the retaining device, a sliding connection, in which the fastening mechanism is positively brought in engagement with retaining elements of the retaining device, a bayonet connection, a latching connection formed similar to a snap connection, in which for example the retaining element of the retaining device is provided as spring-biased ball in which a spherical receptacle of the fastening mechanism snaps into place, or a dovetail connection, in which the fastening mechanism includes a dovetail recess which is put onto a dovetail-shaped web of the retaining device in axial direction.

The actuation of the eccentric 42 can be effected by means of a slide, a pivoted lever, a key or a rotary knob.

As has been described above with reference to FIGS. 3 to 6, a locking mechanism serves to avoid an inadvertent release of the drive system 2 from the retaining device 3 connected with the camera lens 1. This locking mechanism 5 can be realized
by a locking pawl as described above,
by disengaging the actuating element of the fastening mechanism,
by an actuation of the actuating element for the fastening mechanism in a specified sequence or different direction, or
by a locking slide blocking the actuating element of the fastening mechanism.

Alternatively, the actuating and locking elements also can be arranged on the retaining device 3 instead of the fastening mechanism 4, so that only the fixed connecting elements are integrated into the drive system 2.

As due to the geometrical design specifications the connection of the drive system 2 with a camera lens 1 only is possible when the external toothings of the lens rings are located at predetermined axial positions and have a specified diameter or a correspondingly specified number of teeth, a further object consists in forming the drive system such that it can be attached to camera lenses with different axial positions of the external toothing of the lens rings as well as different diameters or numbers of teeth of the external toothing of the lens rings.

Figure 7:
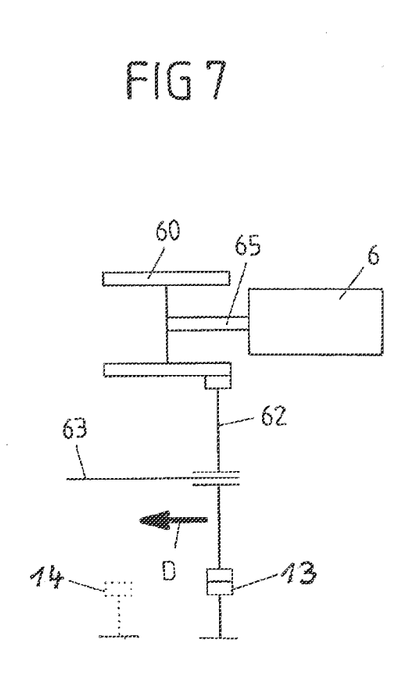
FIG. 7 shows a schematic representation of a driving device connectable with the external toothing of two lens rings via an intermediate gear.
Figure 8:
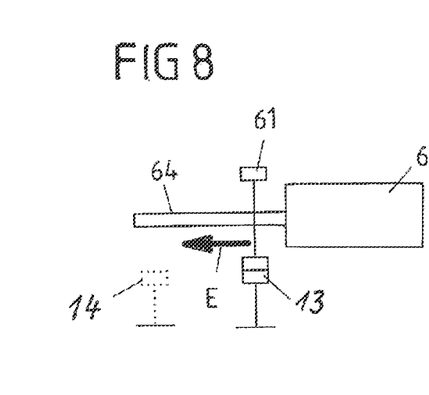
FIG. 8 shows a schematic representation of a drive pinion shiftable on a polygonal shaft between the external toothings of two lens rings.
Figure 9:
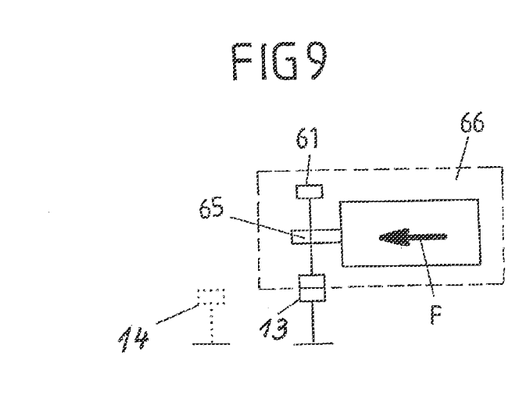
FIG. 9 shows a schematic representation of a driving device shiftable between the external toothings of two lens rings on a carriage aligned parallel to the optical axis of the camera lens.

For the solution of this object the driven gear on the one hand is designed axially shiftable and the drive system 2 in a position tilted differently with respect to the optical axis of the respective camera lens is connected with the respective camera lens. With reference to FIGS. 7 to 9, this will be explained in detail with respect to the axial shiftability of the driven gear, and with reference to FIGS. 10 and 11 with respect to the different tilt of the drive system 2.

The axial displacement of the driven gear can be effected in different ways.

In a first embodiment schematically shown in FIG. 7, the drive pinion 60 connected with the drive shaft 65 of a drive unit 6 has an increased tooth width and is in meshing engagement with an intermediate gear 62 shiftable on a shaft 63 axially in direction of the arrow D according to FIG. 7, i.e. parallel to the optical axis of the camera lens 1, and meshing with the external toothing 13 of a first lens ring. By shifting the intermediate gear 62 along the shaft 63 in direction of the arrow D, the toothing of the intermediate gear 62 is brought in engagement with the external toothing 14 of a second lens ring, without the toothing of the intermediate gear 62 getting out of engagement with the toothing of the drive pinion 60.

In a second embodiment schematically shown in FIG. 8, the drive pinion 61 is arranged on a polygonal or spline shaft 64 connected with the drive unit 6 and driven by the same, whose length is dimensioned such that it bridges the distance between the external toothing 13 of a first lens ring and the external toothing 14 of a second lens ring. When changing the drive, the drive pinion 61 is shifted on the polygonal or spline shaft 64 for example in direction of the arrow E from the meshing engagement into the external toothing 13 of the first lens ring into the meshing engagement with the external toothing 14 of the second lens ring, wherein as a result of the positive, but axially shiftable connection of the drive pinion 61 with the polygonal or spline shaft 64 the torque transmission from the drive unit 6 to the external toothing 13, 14 of the first or second lens ring is ensured.

In a third embodiment schematically shown in FIG. 9, the drive unit 6 with the drive shaft 65 and the drive pinion 61 fixed on the drive shaft 65 is located on a carriage 66 which is mounted on a rail guide aligned parallel to the optical axis of the camera lens 1, so that by shifting the drive unit 6 with the drive pinion 61 in direction of the arrow F, the drive pinion 61 can be moved from the meshing engagement into the external toothing 13 of a first lens ring into the meshing engagement with the external toothing 14 of a second lens ring.

The axial adjustment of the drive mechanism preferably is effected by means of a lever mechanism, for example by means of a fork mechanism, sliding lever or the like, wherein specified latching positions ensure the correct meshing engagement of the drive pinion 61 or intermediate gear 62 into the external toothings 13, 14 of the lens rings and hence the correct axial position of the drive mechanism.

To ensure the correct radial position with different diameters of the external toothings of lens rings, the drive system is connected with the respective camera lens tilted slightly differently in dependence on the geometry of the respective camera lens. The different tilt of the drive system is specified by the different arrangement of the retaining device at the respective camera lens. This will be explained in detail with reference to the schematic representations in FIGS. 10 and 11.

Figure 10:
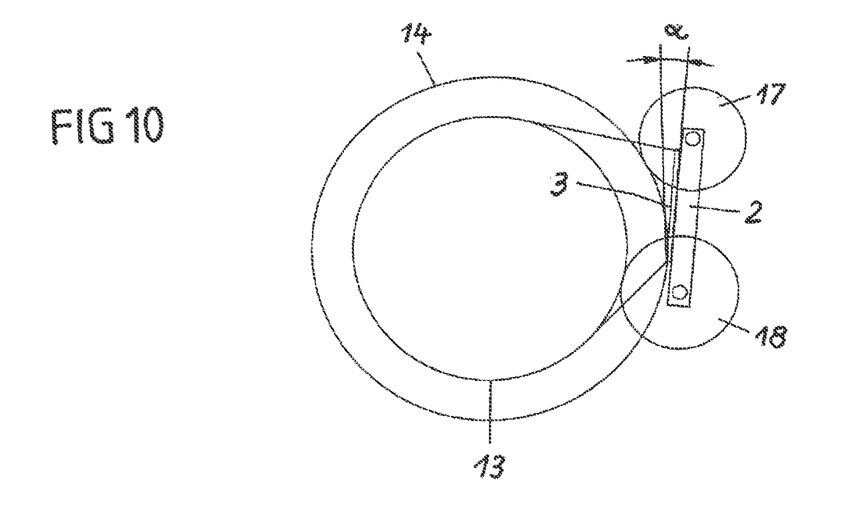
FIGS. 10 and 11 show schematic representations of a driving device formed tiltable for adaptation to different diameters of the external toothings of two lens rings.

FIG. 10 schematically shows the external toothings 13, 14 of two lens rings of a first camera lens, which mesh with the driven gears 17, 18 of two driving devices of the drive system 2. For the correct radial meshing engagement, the retaining plate 3 for accommodating the drive system 2 is connected with the camera lens such that it includes an angle α with the vertical (i.e. vertically to the optical axis of the camera lens and in gravitational direction). In the schematic representation according to FIG. 11, the drive system 2 is connected with a second camera lens, whose first lens ring has an external toothing 15 which is larger than the external toothing 13 of the first lens ring according to FIG. 10, while the diameter of the external toothing 16 of the second lens ring for example corresponds to the diameter of the external toothing 14 of the second lens ring of the first camera lens. Of course, the outside diameters of the external toothings 14 and 16 can be dimensioned different in size.

Figure 11:
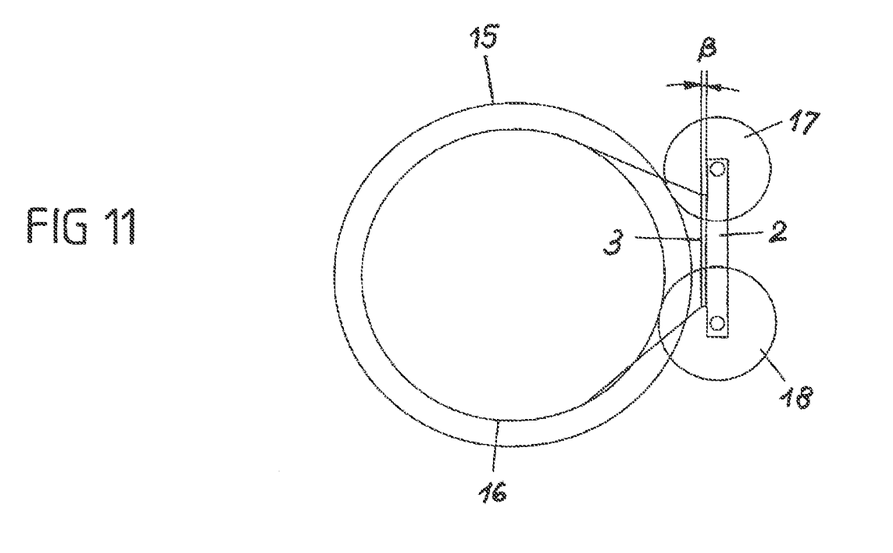

For mounting the drive system 2 on the second camera lens according to FIG. 11, the retaining plate 3 is attached to the second camera lens such that it includes an angle β to the vertical, wherein β<α, so that with respect to the second camera lens the drive system 2 has a smaller tilt with respect to the vertical than the drive system 2 according to FIG. 10, which is connected with the first camera lens.

In one exemplary embodiment, the drive system 2 includes two firmly mounted driving devices for two lens rings, for example for zoom and iris adjustment, wherein the driven gear of one of the two driving devices is designed axially shiftable. A third driving device, for example for a lens ring for focus adjustment, is designed as additional module which can be retrofitted depending on demand or originally be integrated into the drive system 2. To produce a correct axial and radial position of the driving device for the third lens ring, the following possibilities exist:

1. Fastening points for the third driving device are provided on the retaining device in the position each matching with the camera lens.
2. The assembly of the driving device for the third lens ring is effected with additional intermediate adapters, which are arranged either in the driving device or on the retaining device.
3. In the drive system different mounting positions are provided for different camera lenses to which the driving device for the third lens ring is attached.

The assembly of the driving device for the third lens ring preferably likewise is effected in a tooless and/or screwless manner, but alternatively can also be effected by means of a screw connection.

Due to the arrangement of a corresponding sensor, the presence of the driving device for the third lens ring can be detected and hence automatically be recognized by the electronic control unit of the drive system.

Since the drive system can be attached to different types of camera lenses and these camera lenses also can include a plurality of different scale classes within a series, the problem occurs that the respective scales or settings of the lens rings of the respective camera lens must correctly be detected electronically.

As a result of the firm connection of the retaining device 3 with the respective camera lens 1 it is advantageous not to store the scales or settings of the lens rings of the respective camera lens 1 in the drive system 2, but to provide the retaining device 3 with a data memory in which the respective metadata for the scales or settings of the lens rings are stored. Since the retaining device 3 remains at the respective camera lens 1, the respective data are read out from the electronic control unit of the drive system 2 in the case of a lens change and are taken into account correspondingly in the adjustment of the lens rings. For the calibration of the lens rings, the electronic control unit of the drive system 2 also can describe the data memory connected with the retaining device 3.

Due to the connection of the data memory integrated into the retaining device with the drive system, the data read out from the data memory thus need not be output to the camera, but can directly be provided to the drive system.

In the case of a connection of the camera lens 1 with a control and data bus as well as the power supply of the camera via the lens mount, it is possible to provide an electric and electronic interface at the retaining device 3. Via this interface, both the power supply and the data transmission between camera and camera lens 1 as well as the data transmission between the data memory arranged in the retaining device or retaining plate 3 and the electronic control unit of the drive system 2 can be effected.

The power supply and data transmission can be effected both via mechanical, electrical and electronic contacts and in a contactless manner. A contactless energy and data transmission can be effected for example by means of
inductive coupling for energy and data transmission,
infrared transmitters and receivers for data transmission,
RFID transponders for data transmission,
capacitive coupling for data transmission.

Useful mechanical, electrical contacts for data and energy transmission include
spring contacts
end-face contacts and
blind-mating contacts consisting of a contact pin and a contact socket.

In a configuration of the data and energy transmission both with mechanical, electrical contacts and by means of a contactless technology, the data preferably are transmitted in a contactless manner, while the energy transmission is effected via mechanical, electrical contacts.

LIST OF REFERENCE NUMERALS 1 camera lens
2 drive system
3 retaining device (retaining plate)
4 fastening mechanism
5 locking mechanism
6 drive unit
10 lens mount
11, 12 lens rings
13-16 external toothings
17, 18 driven gears
20 housing
21 handle
22 switch
30 screw connections
31, 32 retaining elements
33 recess
40 fastening bridge
41 hook
42 eccentric
43 bearing pin
44 hanging groove
45 recess
46 spiral spring
47 block
50 locking bolt
60, 61 drive pinion
62 intermediate gear
63 shaft
64 polygonal or spline shaft
65 drive shaft
66 carriage

The invention claimed is:

1. A device for adjusting a camera lens, comprising at least one lens ring rotatable about an optical axis of the camera lens for zoom, focus or aperture adjustment, which is connectable with a driving device actuatable by an electronic control unit, in particular for a camera lens of a digital motion picture camera, and a retaining device connected with the camera lens for accommodating a drive system containing the driving device and the electronic control unit,
wherein the connection between the retaining device and a fastening mechanism is formed as an eccentric connection, in which the retaining device includes a first retaining element and on a circumference of the camera lens a second retaining element spaced from the first retaining element, and the fastening mechanism includes a hook positively connectable with the first retaining element and an eccentric positively connectable with the second retaining element.

2. The device according to claim 1, wherein the camera lens includes three rotatable lens rings with an external toothing, of which two lens rings are adjustable by means of a first, axially shiftable driving device and the third lens ring is adjustable by means of a second, preferably modular driving device.

3. The device according to claim 2, wherein the retaining device connected with the camera lens fastening points for the second driving device connectable with the third lens ring are arranged in the position each matching with the camera lens.

4. The device according to claim 2, wherein the connection between the retaining device and the second driving device is effected via an intermediate adapter.

5. The device according to claim 2, wherein the driving devices are arranged in the drive system at mounting positions dependent on the camera lens.

6. The device according to claim 1, wherein the retaining device is adapted to the contour of the camera lens and formed to rest flat against the camera lens.

7. The device according to claim 6, wherein the retaining device includes a retaining plate adapted to the curvature of the camera lens with retaining elements spaced from each other.

8. The device according to claim 1, further including a locking mechanism blocking the connection between the retaining device and the fastening mechanism.

9. The device according to claim 8, wherein the locking mechanism consists of a spring-loaded locking pawl, a disengaging device for actuating element or a locking slide.

10. The device according to claim 1, wherein the camera lens includes at least two rotatable lens rings with an external toothing and that the driving device contains a driven gear connected with a drive unit, which for meshing engagement into the external toothing of one of the two lens rings is axially shiftable parallel to the optical axis of the camera lens.

11. The device according to claim 10, wherein the driven gear includes a drive pinion connected with the drive unit and an intermediate gear meshing with the drive pinion and the external toothing each of one of the two lens rings, which is axially shiftable from the external toothing of the first lens ring to the second lens ring, and wherein the tooth width of the drive pinion is dimensioned such that the intermediate gear is in meshing engagement with the drive pinion along the entire length of the axial displacement of the intermediate gear.

12. The device according to claim 10, wherein the drive pinion is axially shiftably arranged on a polygonal or spline shaft connected with the drive unit.

13. The device according to claim 10, wherein the drive unit with the drive pinion is shiftably arranged on a carriage aligned parallel to the optical axis of the camera lens.

14. The device according to claim 1, wherein the retaining device contains a data memory which stores the scales or settings of the lens rings, which can be read out from the electronic control unit of the drive system.

15. The device according to claim 14, wherein for calibration of the lens rings the data memory is writable by means of the electronic control unit.

16. The device according to claim 1, wherein the drive system includes a fastening mechanism which is positively and/or non-positively connectable with the retaining device.

17. The device according to claim 1, wherein the connection between the retaining device and the fastening mechanism is formed as a snap, latching, bayonet, clamping, sliding or dovetail connection.

18. The device according to claim 1, wherein the eccentric is connected with an actuating element, in particular with a slide, lever, rotary knob or a key.

19. The device according to claim 1, wherein the power supply of the drive system is effected by means of inductive coupling, via spring contacts, end-face contacts or blind-mating contacts consisting of a contact pin and a contact socket of the retaining device connected with the power supply of the camera.

20. The device according to claim 1, wherein the data transmission between the camera and the drive system as well as between the data memory of the retaining device and the drive system is effected in a contactless manner by means of inductive coupling, by means of an infrared transmitter and receiver, by means of an RFID transponder or by means of capacitive coupling or via mechanical, electrical contacts, in particular spring contacts, end-face contacts or blind-mating contacts.

21. A device for adjusting a camera lens, comprising at least one lens ring rotatable about an optical axis of the camera lens for zoom, focus or aperture adjustment, which is connectable with a driving device actuatable by an electronic control unit, in particular for a camera lens of a digital motion picture camera, and a retaining device connected with the camera lens for accommodating a drive system containing the driving device and the electronic control unit, wherein for adaptation to different external toothings of the at least one lens rings the drive system is formed tiltable, wherein a tilt angle of the drive system depends on an arrangement and alignment of the retaining device connected with the camera lens.

* * * * *